(12) United States Patent
Eaton et al.

(10) Patent No.: US 6,839,697 B2
(45) Date of Patent: Jan. 4, 2005

(54) SYSTEM AND METHOD FOR WEIGHING ITEMS SUCH AS MAILPIECES IN THE PRESENCE OF EXTERNAL VIBRATION

(75) Inventors: David J. Eaton, Newtown, CT (US); John E. Massucci, Bronx, NY (US); John P. Miller, Shelton, CT (US)

(73) Assignee: Pitney Bowes Inc., Stamford, CT (US)

(*) Notice: Subject to any disclaimer, the term of this patent is extended or adjusted under 35 U.S.C. 154(b) by 109 days.

(21) Appl. No.: 10/185,947

(22) Filed: Jun. 28, 2002

(65) Prior Publication Data

US 2004/0002927 A1 Jan. 1, 2004

(51) Int. Cl.[7] .............................................. G06F 17/60
(52) U.S. Cl. ................ 705/414; 177/25.12; 177/25.13; 702/173; 705/415
(58) Field of Search ......................... 177/25.15, 25.13; 702/41, 42, 173; 705/400, 401, 407, 414, 415

(56) References Cited

U.S. PATENT DOCUMENTS

| | | | | |
|---|---|---|---|---|
| 3,205,956 A | * | 9/1965 | Bell et al. ........................ | 177/3 |
| 3,826,319 A | * | 7/1974 | Losbough ..................... | 177/25 |
| 4,102,421 A | * | 7/1978 | Ozaki et al. ................. | 177/185 |
| 4,347,903 A | * | 9/1982 | Yano et al. ............... | 177/25.13 |
| 4,351,033 A | | 9/1982 | Uchimura et al. ........... | 364/900 |
| 4,516,209 A | | 5/1985 | Scribner ...................... | 364/466 |
| 4,742,878 A | | 5/1988 | Freeman et al. ............... | 177/25 |
| 4,787,048 A | | 11/1988 | Freeman et al. ............. | 364/466 |
| 5,119,306 A | | 6/1992 | Metelits et al. .............. | 364/464 |
| 5,172,783 A | | 12/1992 | Feinland et al. ............. | 177/185 |
| 5,178,228 A | | 1/1993 | Feinland et al. ............. | 177/185 |
| 5,226,496 A | | 7/1993 | Feinland et al. ......... | 177/25.15 |
| 5,717,166 A | | 2/1998 | Talmadge ................ | 177/25.13 |
| 5,723,825 A | | 3/1998 | Dolan et al. ................. | 177/145 |

FOREIGN PATENT DOCUMENTS

GB           B2194349 A   *   3/1988

OTHER PUBLICATIONS

Toupin: "Throw your weight into the right scale"; Design News Feb. 21, 2000, vol. 55, No. 4, p. 19.*

* cited by examiner

Primary Examiner—Edward R. Cosimano
(74) Attorney, Agent, or Firm—Brian A. Lemm; Angelo N. Chaclas

(57) ABSTRACT

A system and method for weighing of items such as mailpieces in the presence of external vibration such as ground noise. The system includes a scale system having a platform connected to a load cell, which provides an output signal to an analog-to-digital converter. The resulting digital output signal is processed by a low pass filter and analyzed by a microprocessor to determine weights of items on the platform. The microprocessor also determines postage amounts as functions of the weights and outputs these postage amounts to a postage meter. The system also includes an accelerometer and a limit detector for generating a no go signal if external vibrations exceed a predetermined limit. The microprocessor accepts a weight as valid if the external vibrations do not exceed the limit at any time while the weight is being determined and otherwise initiates an alternative weight determining method.

19 Claims, 3 Drawing Sheets

SYSTEM AND METHOD FOR WEIGHING ITEMS SUCH AS MAILPIECES IN THE PRESENCE OF EXTERNAL VIBRATION

BACKGROUND OF THE INVENTION

The present invention relates to a system and method for rapid weighing of items. More particularly it relates to scale systems used in postage metering systems to weigh, and determine postage for, mailpieces or the like.

Postal scale systems are well known. Such scale systems weigh a mailpiece and determine the appropriate postage for that mailpiece as a function of the weight. Postal mailing systems where a mailpiece is transported onto a postage scale system, the appropriate postage is determined, and the mailpiece is then transported to postage metering system for imprinting with a postal indicium representative of the postage determined are also known. One such system is described in U.S. Pat. No. 4,742,878; issued May 10,1988. In such systems there is a constant need to increase the rate at which the scale can determine the weight of a mailpiece in order that the throughput of the system can be increased.

U.S. Pat. No. 4,787,048; issued: Nov. 22, 1988, discloses one approach to decreasing the time required for a postage scale system to determine the weight of a mailpiece. The system disclosed in this patent takes advantage of the structure of postage rate charts, i.e., the function that relates the weight of the mailpiece to the appropriate postage amount. Such rate charts provide a constant postage value for all weights between a pair of predetermined weight breaks. The system of the '048 patent takes advantage of this by use of an algorithm where a first estimate of the weight is made and used to determine the postage amount unless the first estimate is within a predetermined distance of a break point, in which case a second more accurate estimate is made.

A basic cause of the delay in determining weight for a mail piece is the tendency for a scale system to oscillate in response to the arrival of the mailpiece on the system. These oscillations are damped, but only slowly arrive at a new stable output value representative of the weight of the mail piece. Heretofore systems have relied on an averaging process over a number of samples taken over a number of cycles of the oscillations to approximate the weight output. While systems using such averaging type algorithms have generally proved satisfactory in the past, presently they are approaching limits such that it is difficult to increase the throughput of postage metering systems using such algorithms. One approach to increasing the speed with which weights are determined has been to develop algorithms, which determine a weight, at least to a broad approximation, from the initial transient response to a mail piece or other item arriving on a scale platform. One example of such an algorithm is commonly assigned, co-pending application Ser. No. 10/165,161, titled: SYSTEM AND METHOD FOR FAST WEIGHING OF ITEMS SUCH AS MAILPIECES; filed Jun. 7, 2002, which attempts to identify mail pieces in the first weight range (<1 oz.) from the initial response to the mail piece.

This problem is exacerbated by the presence of external (e.g. ground) vibrations, which can slow or even prevent the scale system output from converging to a sufficiently accurate approximation of the weight. One approach to the problem of external vibrations is to use sophisticated weighing algorithms that can determine a weight in the presence of external vibrations. One example of such an algorithm is commonly assigned, co-pending application Ser. No. 10/165,532; titled: SYSTEM AND METHOD FOR WEIGHING ITEMS SUCH AS MAILPIECES IN THE PRESENCE OF EXERNAL VIBRATION; filed Jun. 7, 2002. Such algorithms are complex and can be relatively slow. Further they rely on assumptions about the vibration spectrum and so may not prove effective in all cases. Still further, since they require time to identify external vibrations, they are not useful with algorithms based on the initial transient response, as discussed above.

Another approach to the problem of external vibration that has been considered by the present inventors is to separately measure the external vibration and subtract it out from the weight signal. While perhaps technically feasible, this approach has proved difficult and ultimately may prove too expensive for applications such as postal scales.

Thus it is an object of the present invention to provide a scale system, and a postage metering system incorporating such scale system, which can determine the weight of a mailpiece or the like even in an environment where periods of external vibrations which would delay or prevent convergence of the system output can occur.

BRIEF SUMMARY OF THE INVENTION

The above object is achieved and the disadvantages of the prior art are overcome in accordance with the subject invention by a method and system for determining a weight for an item; the system including a scale system for generating a digital output signal, and a data processing system. The scale system includes: a support for supporting the item; a transducer for generating the digital output signal, the signal being representative of an instantaneous response of the support; and an external vibration detector for monitoring external vibrations and generating a no go signal if external vibrations exceed a predetermined level. In accordance with the method of the present invention the data processing system is programmed to: apply a predetermined weighing algorithm to the digital output signal to determine the weight for the item; and abort the predetermined weighing algorithm and initiate an alternative weighing method if, at anytime during application of the predetermined weighing algorithm prior to determination of the weight, the no go signal is detected.

In accordance with one aspect of the present invention, the predetermined weighing algorithm is based on an initial transient response to the presence of the item on the support.

In accordance with another aspect of the present invention, the alternative weighing method includes a second weighing algorithm, which is less sensitive to external vibration than the predetermined algorithm.

In accordance with another aspect of the present invention, only vertical components of the external vibrations are monitored.

In accordance with another aspect of the present invention, the external vibration detector includes an accelerometer and a level detector.

In accordance with another aspect of the present invention, the transducer includes a load cell; the load cell includes a four-bar linkage; one member of the four-bar linkage is fixed to mechanical ground; and the accelerometer is fixed to the one member.

In accordance with another aspect of the present invention, the item is a mail piece and the data processing system is further for determining a postage amount for the mail piece, and the system further includes a postage metering system responsive to the data processing system for printing the postage amount on the mail piece.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
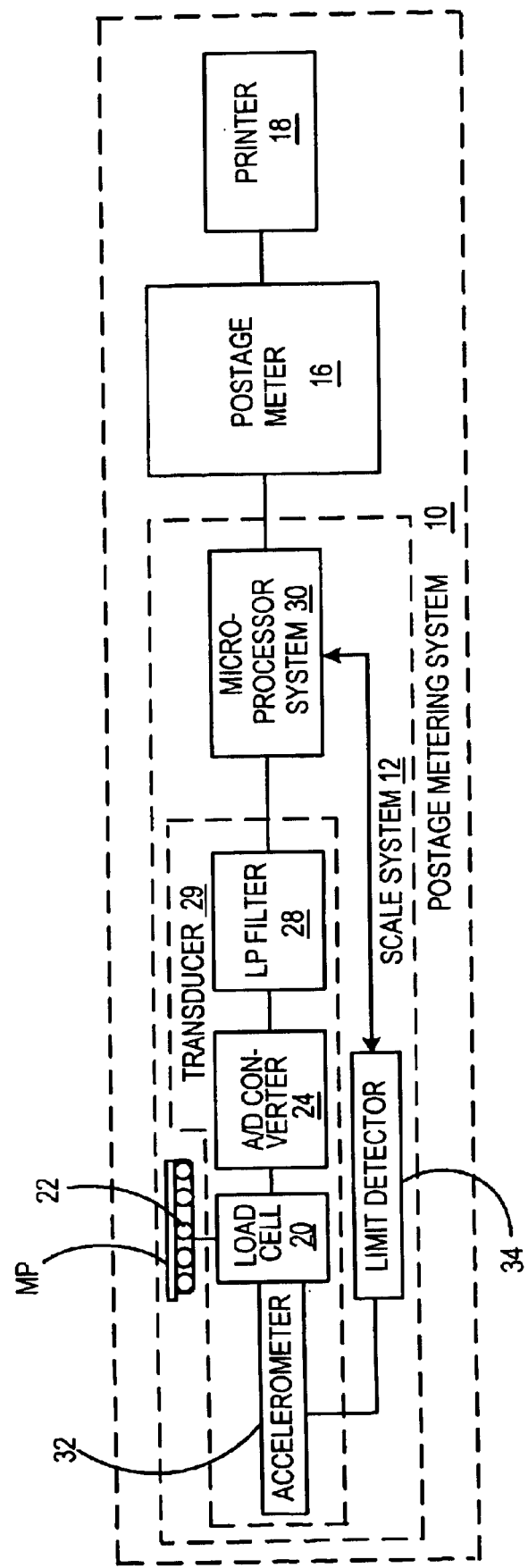
FIG. 1 shows a schematic block diagram of a postage metering system including a scale system in accordance with the present invention.

In FIG. 1 postage metering system 10 includes scale system 12, postage meter 16, and printer 18. Scale system 12 includes load cell 20, producing a response to the force from platform 22, supporting mailpiece MP; analog-to digital converter 24, for converting the output of load cell 20 to a sequence of digital values; low pass filter 28, which together comprise transducer 29 for producing a digital output representative of the response of platform 22; and microprocessor 30, for processing the output to determine a weight for mail piece MP and provide an output representative of the postage corresponding to that weight to conventional postage meter 16, which in turn controls printer 18 to print a corresponding postal indicia on mail piece MP. (While filter 28 is shown as a separate element in FIG. 1 for simplicity of illustration, it should be noted that filter 28 can be, and preferably is, implemented by software running in microprocessor 30.)

Figure 2:
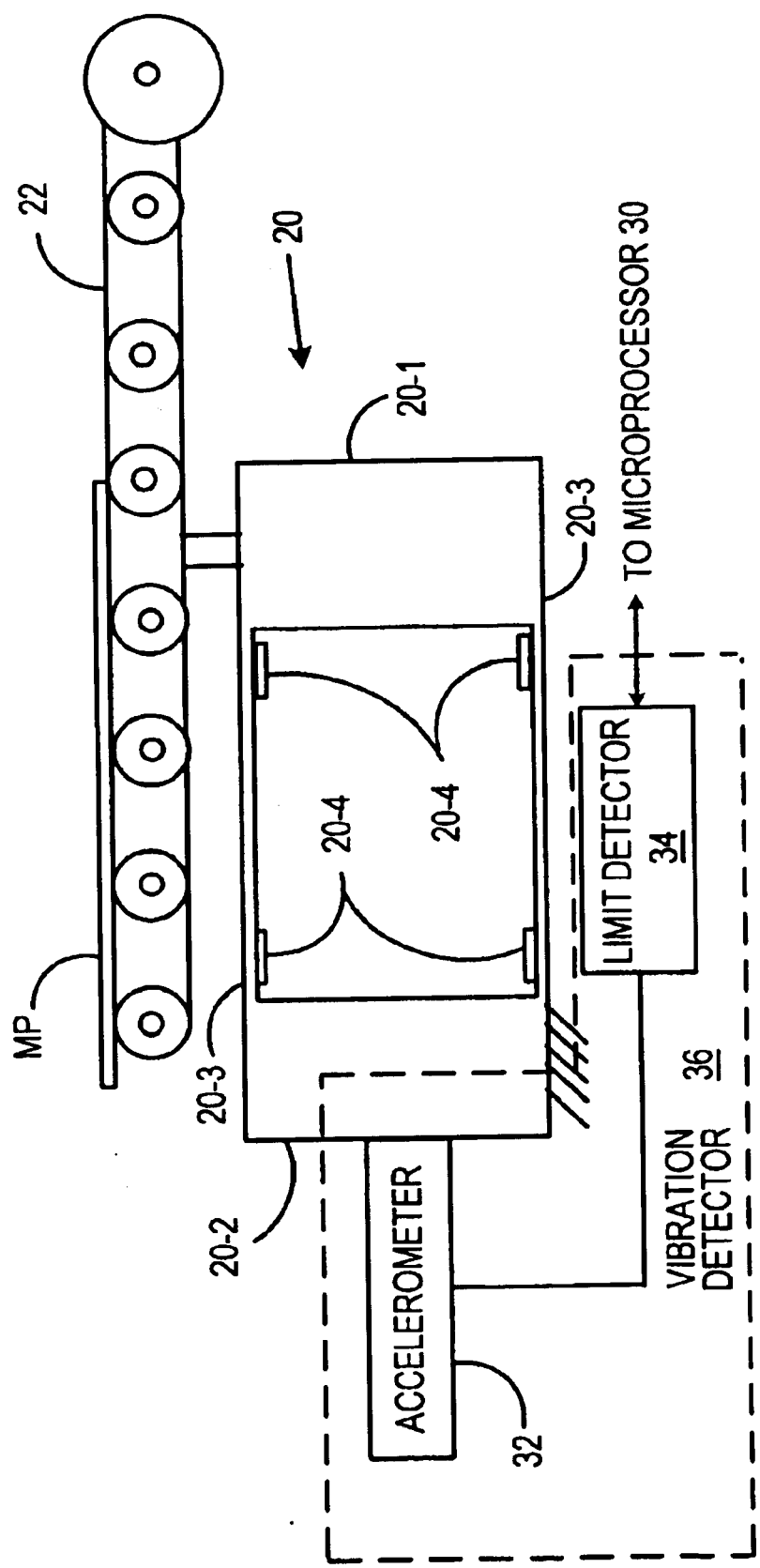
FIG. 2 shows a schematic block diagram of a load cell for producing a response to the force from platform supporting mailpiece, and an accelerometer for detecting external vertical vibrations, and a limit detector for providing a go/no go binary signal.

Scale system 12 also includes accelerometer 32 for detecting external vertical vibrations which might affect the scale output, and limit detector 34 for providing a go/no go binary signal to microprocessor 30 and which together form external vibration detector 36 (FIG. 2). Detector 34 provides a no go signal when the absolute value of the output of accelerometer 32 exceeds predetermined limits, as will be described further below.

The acceptable range of external vibration will vary with the particular weighing algorithm used and the acceptable trade off between processing speed and error rate for a particular application. Different algorithms will have differing sensitivities to external vibration and for any particular application (including the anticipated vibration environment) there will be requirements for the error rate for weight determination and for the processing rate. For any particular algorithm, increasing the acceptable range of external vibration will tend to increase both the error rate (as weight determinations can be made in the presence of greater external vibration) and the processing rate (as the algorithm is aborted less often). It is believed that an optimal range of acceptable external vibration balancing these constraints can best be determined by routine experimentation well within the abilities of those skilled in the art. Accelerometer 32 is preferably in two way communication with processor 30 to allow processor 30 to alter the predetermined limits for various applications.

FIG. 2 shows a more detailed representation of load cell 20, which functions as a transducer to convert the force applied by platform 22 and mail piece MP to generate an analog signal for further processing. Load cell 20 comprises vertical, substantially rigid, members 20-1 and 20-2 that are connected by flexible members 20-3 to form a conventional four-bar linkage. Member 20-1 supports platform 22 and is free to deflect vertically in response to the force applied by platform 22, while member 20-2 is fixed to mechanical ground. Strain gauges 20-4 are fixed to flexible members 20-4 and interconnected to form a bridge circuit (not shown). The output of the bridge circuit is proportional to the instantaneous displacement of member 20-1; and thus, after the transient response has died out, the weight of platform 22 and mail piece MP. It will be apparent that external vibration, typically ground vibration, can delay or even prevent generation of an output which accurately represents the weight since the vertical acceleration of mechanical ground caused by external vibration is indistinguishable by load cell 20 from a force applied by platform 22.

To overcome this, accelerometer 32 is fixed to mechanical ground, and preferably to member 20-2, so that the vertical component of any acceleration of mechanical ground is sensed. (Horizontal components of external vibration can apply a torque to load cell 20 and also cause an inaccurate response. However, the vertical component is dominant and it is believed that it is sufficient, in general, to monitor only the vertical component. In particular applications it may be desirable to monitor the total magnitude of acceleration caused by external vibration, and the use of additional accelerometers to measure horizontal accelerations is within the contemplation of the present invention.) The output of accelerometer 32 is input to limit detector 34, which generates a binary go/no go signal. The output of detector 34 latches to the no go value if the absolute value of the output of accelerometer 32 exceeds a predetermined limit; which is preferably determined by experimentation as described above. The go/no go signal is used by microprocessor 30 to validate a weight which is determined by a weighing algorithm, as will be described further below.

Figure 3:
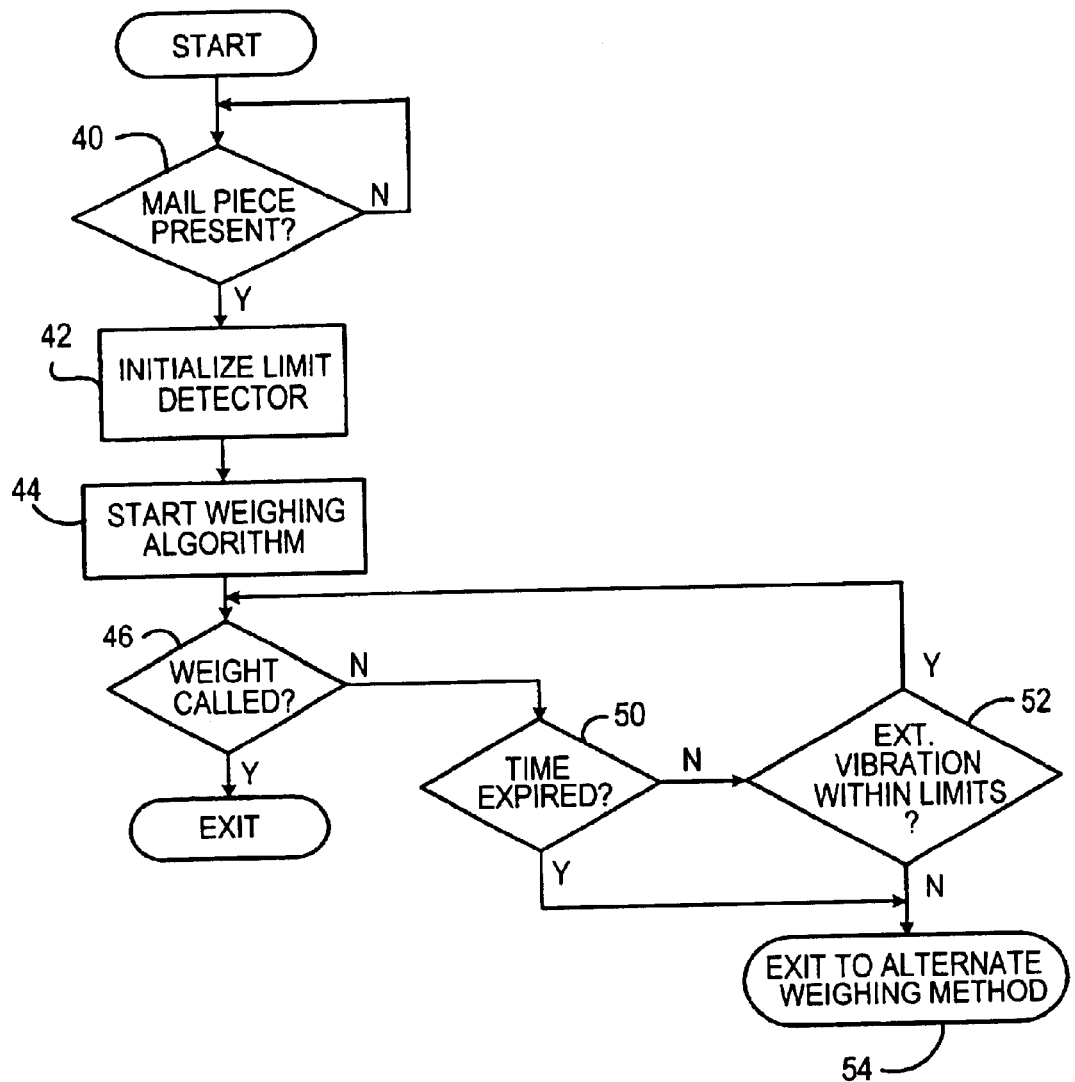
FIG. 3 shows a flow diagram of the method of the present invention.

FIG. 3 shows a flow diagram of the operation of scale system 12 in accordance with the present invention. At step 40 microprocessor 30 loops until a mail piece MP is present on platform 22. Then at step 42 it initializes limit detector 34 to a go state, and at step 44 starts a weighing algorithm to call a weight for mail piece MP. (Calling a weight, as used herein, means microprocessor 30 uses the current weight value to determine the postage for a mailpiece.)

Any convenient weighing algorithm can be used in the present invention and the choice of weighing algorithm forms no part of the present invention in its broadest contemplation (unless, and to the extent, specifically claimed). In some preferred embodiments a weighing algorithm based upon the initial transient response to the presence of mail piece MP, such as the algorithm described in the above described application Ser. No. 10/165,532; titled: SYSTEM AND METHOD FOR WEIGHING ITEMS SUCH AS MAILPIECES IN THE PRESENCE OF EXERNAL VIBRATION, or other initial transient based algorithm, is used since it is believed that such algorithms are more reliable if used in the absence of external vibration.

Then at step 46 microprocessor 30 determines if a weight has been called. If so it exits. Otherwise at step 50 microprocessor 30 determines if a predetermined time, typically 100 to 120 milliseconds, has elapsed. If not at step 52 microprocessor 30 determines if the external vibration limits have been exceeded, i.e. if limit detector 34 has latched into a no go state. Thus a weight called within the predetermined time and without external vibrations exceeding predetermined limits is assumed valid. Otherwise, if the time or vibration limits are exceeded, microprocessor 30 exits at step 54 to an alternative weighing method.

Any convenient alternative weighing method can be used in the present invention and the choice of weighing algorithm forms no part of the present invention in its broadest contemplation (unless, and to the extent, specifically claimed). In some preferred embodiments a weighing algorithm which is less sensitive to external vibration than the algorithm used in step 44 can be used. For example, the algorithm described in the above mentioned application Ser. No. 10/165,161; titled: SYSTEM AND METHOD FOR FAST WEIGHING OF ITEMS SUCH AS MAILPIECES, or other vibration resistant algorithms, can be used. In some simple embodiments the original algorithm is simply restarted one or more times in the hope that the external vibration will naturally die down.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A system for determining a weight for an item, comprising:
   a) a scale system for generating a digital output signal, said scale system comprising:
      a1) a support for supporting said item;
      a2) a transducer for generating said digital output signal, said signal being representative of an instantaneous response of said support; and
      a3) an external vibration detector for monitoring external vibrations and generating a no go signal if external vibrations exceed a predetermined level; and
   b) a data processing system for:
      b1) applying a predetermined weighing algorithm to said digital output signal to determine said weight for said item; and
      b2) aborting said predetermined weighing algorithm and initiating an alternative weighing method if, at anytime during application of said predetermined weighing algorithm prior to determination of said weight, said no go signal is detected.

2. A system as described in claim 1 where said alternative weighing method comprises a second weighing algorithm which is less sensitive to external vibration than said predetermined algorithm.

3. A system as described in claim 1 where only vertical components of said external vibrations are monitored.

4. A system as described in claim 1 where said item is a mail piece and said data processing system is further for determining a postage amount for said mail piece; said system further comprising a postage metering system responsive to said data processing system for printing said postage amount on said mail piece.

5. A system as described in claim 1 where said predetermined weighing algorithm is based on an initial transient response to the presence of said item on said support.

6. A system as described in claim 5 where said alternative weighing method comprises a second weighing algorithm which is less sensitive to external vibration than said predetermined algorithm.

7. A system as described in claim 1 where said data processing system also aborts said predetermined weighing algorithm if said weight is not determined within a predetermined time.

8. A system as described in claim 7 where said predetermined time is approximately 100 to 120 milliseconds.

9. A system as described in claim 1 where said external vibration detector comprises an accelerometer and a level detector.

10. A system as described in claim 9 where said transducer comprises a load cell; said load cell includes a four-bar linkage; one member of said four-bar linkage is fixed to mechanical ground; and said accelerometer is fixed to said one member.

11. A system as described in claim 10 where said accelerometer measures only vertical components of acceleration.

12. A method for determining a weight for an item, comprising the steps of:
   a) generating a digital output signal in response to said item's presence on a support;
   b) generating a no go signal if external vibrations exceed a predetermined level;
   c) applying a predetermined weighing algorithm to said digital output signal to determine said weight for said item; and
   d) aborting said predetermined weighing algorithm and initiating an alternative weighing method if, at anytime during application of said predetermined weighing algorithm prior to determination of said weight, said no go signal is detected.

13. A method as described in claim 12 where said alternative weighing method comprises a second weighing algorithm that is less sensitive to external vibration than said predetermined algorithm.

14. A method as described in claim 12 where only vertical components of said external vibrations are monitored.

15. A method as described in claim 12 where said item is a mail piece and said method further includes steps of: determining a postage amount for said mail piece; and printing said postage amount on said mail piece.

16. A method as described in claim 12 where said predetermined weighing algorithm is based on an initial transient response to the presence of said item on said support.

17. A method as described in claim 16 where said alternative weighing method comprises a second weighing algorithm that is less sensitive to external vibration than said predetermined algorithm.

18. A method as described in claim 12 where said predetermined weighing algorithm also is aborted if said weight is not determined within a predetermined time.

19. A method as described in claim 18 where said predetermined time is approximately 100 to 120 milliseconds.

* * * * *